(12) United States Patent
Fujisaki et al.

(10) Patent No.: US 9,423,852 B2
(45) Date of Patent: Aug. 23, 2016

(54) SELECTING A STARTUP CONDITION OF AN ELECTRONIC DEVICE CORRESPONDING TO AVAILABLE POWER

(71) Applicant: KABUSHIKI KAISHA TOSHIBA, Minato-ku, Tokyo (JP)

(72) Inventors: Koichi Fujisaki, Kanagawa-ken (JP); Tetsuro Kimura, Tokyo (JP); Tatsunori Kanai, Kanagawa-ken (JP); Haruhiko Toyama, Kanagawa-ken (JP); Junichi Segawa, Kanagawa-ken (JP); Satoshi Shirai, Kanagawa-ken (JP); Masaya Tarui, Kanagawa-ken (JP); Hiroyoshi Haruki, Kanagawa-ken (JP); Yusuke Shirota, Kanagawa-ken (JP); Akihiro Shibata, Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 425 days.

(21) Appl. No.: 13/742,769

(22) Filed: Jan. 16, 2013

(65) Prior Publication Data

US 2013/0219203 A1  Aug. 22, 2013

(30) Foreign Application Priority Data

Jan. 19, 2012  (JP) .................................. 2012-009288

(51) Int. Cl.
  *G06F 1/32*  (2006.01)
(52) U.S. Cl.
  CPC ............ *G06F 1/3206* (2013.01); *G06F 1/3212* (2013.01); *G06F 1/3234* (2013.01); *Y02B 60/1292* (2013.01); *Y02B 60/32* (2013.01)
(58) Field of Classification Search
  CPC ....... G06F 1/3203; G06F 1/32; G06F 1/3212; G06F 1/3253; H04N 19/59
  USPC ....................................................... 713/323
  See application file for complete search history.

(56) References Cited

U.S. PATENT DOCUMENTS

| 5,483,656 | A | * | 1/1996 | Oprescu | .................... G06F 1/26 700/297 |
| 5,563,469 | A | * | 10/1996 | Takamura et al. | ............. 313/141 |

(Continued)

FOREIGN PATENT DOCUMENTS

| CN | 101720120 | 6/2010 |
| EP | 1 139 206 A2 | 10/2001 |

(Continued)

OTHER PUBLICATIONS

Office Action of Notification of Reason(s) for Refusal for Japanese Patent Application No. 2012-009288 Dated Nov. 4, 2014, 5 pages.

(Continued)

*Primary Examiner* — Thomas Lee
*Assistant Examiner* — Santosh R Poudel
(74) *Attorney, Agent, or Firm* — Amin, Turocy & Watson LLP; Gregory Turocy

(57) ABSTRACT

According to an embodiment, a power control device includes a storage unit, a monitor, a determining unit, and a controller. The storage device stores a look-up table, which includes relationship between needed power consumptions and start-up conditions of an electronic device including a plurality of modules. The start-up condition of the electronic device is determined from the needed power consumption in the look-up table and specifies a power on/off status of the modules in the electronic device. The monitor monitors a voltage or available power supplied by a power source when the electronic device is activated. The determining unit determines a start-up condition corresponding to needed power consumption, which corresponds to the voltage or available power monitored by the monitor, with reference to the table. The controller sets a start-up condition of the electronic device to start up the electronic device in the start-up condition determined by the determining unit.

10 Claims, 3 Drawing Sheets

(56) References Cited

U.S. PATENT DOCUMENTS

| | | | |
|---|---|---|---|
| 6,609,208 B1* | 8/2003 | Farkas et al. | 713/320 |
| 7,058,480 B1* | 6/2006 | Kawanishi et al. | 700/286 |
| 7,581,130 B2* | 8/2009 | Carroll et al. | 713/340 |
| 8,369,721 B2* | 2/2013 | Yamada | G03G 15/5004 399/37 |
| 8,433,931 B2* | 4/2013 | Burg | G06F 1/3215 713/300 |
| 2002/0024332 A1* | 2/2002 | Gardner | H02J 3/14 324/103 R |
| 2004/0158878 A1* | 8/2004 | Ratnakar | H04N 19/59 725/150 |
| 2004/0215986 A1* | 10/2004 | Shakkarwar | 713/300 |
| 2005/0048960 A1 | 3/2005 | Yamauchi et al. | |
| 2006/0082222 A1* | 4/2006 | Pincu | H02J 1/102 307/29 |
| 2007/0159235 A1* | 7/2007 | Fukui et al. | 327/537 |
| 2008/0307240 A1* | 12/2008 | Dahan et al. | 713/320 |
| 2009/0193276 A1* | 7/2009 | Shetty et al. | 713/340 |
| 2010/0210322 A1* | 8/2010 | Kim | G06F 1/263 455/574 |
| 2011/0016336 A1* | 1/2011 | Mori | G06F 3/0625 713/320 |
| 2011/0040418 A1* | 2/2011 | Kalen | F03D 9/007 700/291 |
| 2011/0154007 A1* | 6/2011 | Juvonen | G06F 1/3212 713/2 |
| 2011/0231026 A1* | 9/2011 | Yaoyama | G03G 15/5004 700/291 |
| 2012/0023351 A1* | 1/2012 | Wakrat | G06F 1/3203 713/322 |
| 2012/0117399 A1* | 5/2012 | Chan | G06F 9/5094 713/320 |
| 2012/0246356 A1 | 9/2012 | Shibata et al. | |
| 2012/0246390 A1 | 9/2012 | Kanai et al. | |
| 2012/0246458 A1* | 9/2012 | Jain | G06F 1/3253 713/100 |
| 2012/0246501 A1 | 9/2012 | Haruki et al. | |
| 2012/0246503 A1 | 9/2012 | Fujisaki et al. | |
| 2012/0330473 A1* | 12/2012 | Meredith et al. | 700/291 |
| 2013/0073812 A1 | 3/2013 | Kanai et al. | |
| 2013/0080812 A1 | 3/2013 | Shirota et al. | |
| 2013/0080813 A1 | 3/2013 | Tarui et al. | |
| 2013/0091372 A1 | 4/2013 | Kimura et al. | |
| 2013/0191670 A1 | 7/2013 | Haruki et al. | |
| 2013/0254773 A1 | 9/2013 | Kimura et al. | |
| 2013/0268781 A1 | 10/2013 | Kanai et al. | |
| 2013/0270911 A1* | 10/2013 | Baba | H02J 7/34 307/65 |
| 2013/0318372 A1* | 11/2013 | Osborn | G06F 1/3203 713/320 |
| 2013/0339770 A1* | 12/2013 | Tu | G06F 1/32 713/320 |

FOREIGN PATENT DOCUMENTS

| | | |
|---|---|---|
| JP | 2001-273055 | 10/2001 |
| JP | 2002-062955 | 2/2002 |
| JP | 2006-48630 | 2/2006 |
| JP | 2011-013836 | 1/2011 |
| JP | 2011-034381 | 2/2011 |
| JP | 2011-227820 | 11/2011 |

OTHER PUBLICATIONS

Japanese Office Action for Japanese Patent Application No. 2015-122100 mailed on Aug. 4, 2015.

Office Action for Chinese Patent Application No. 201310016337.7 Dated Feb. 27, 2015, 19 pages.

Office Action of Notice of Rejection for Japanese Patent Application No. 2012-009288 Dated Apr. 7, 2015, 11 pages.

"Daemon (software)", online. Retrieved from "Wikipedia, the free encyclopedia" from Nov. 18, 2011. Accessed at: https://web.archive.org/web/20111118201619/http://ja.wikipedia.org/wiki/%E3%83%87%E3%83%BC%E3%83%A2%E3%83%B3_%28%E3%82_%BD%E3%83%95%_E3%83%88%E3%82%A6%E3%82%A7%E3%82%A2%29.

Japanese Office Action for Japanese Patent Application No. 2015-122100 mailed on Jan. 5, 2016.

Chinese Office Action for Chinese Patent Application No. 201310016337.7 mailed on Nov. 3, 2015.

* cited by examiner

| START UP CONDITION | NEEDED POWER CONSUMPTION [W] |
|---|---|
| FIRST CONDITION | X |
| SECOND CONDITION | Y |
| ⋮ | ⋮ |

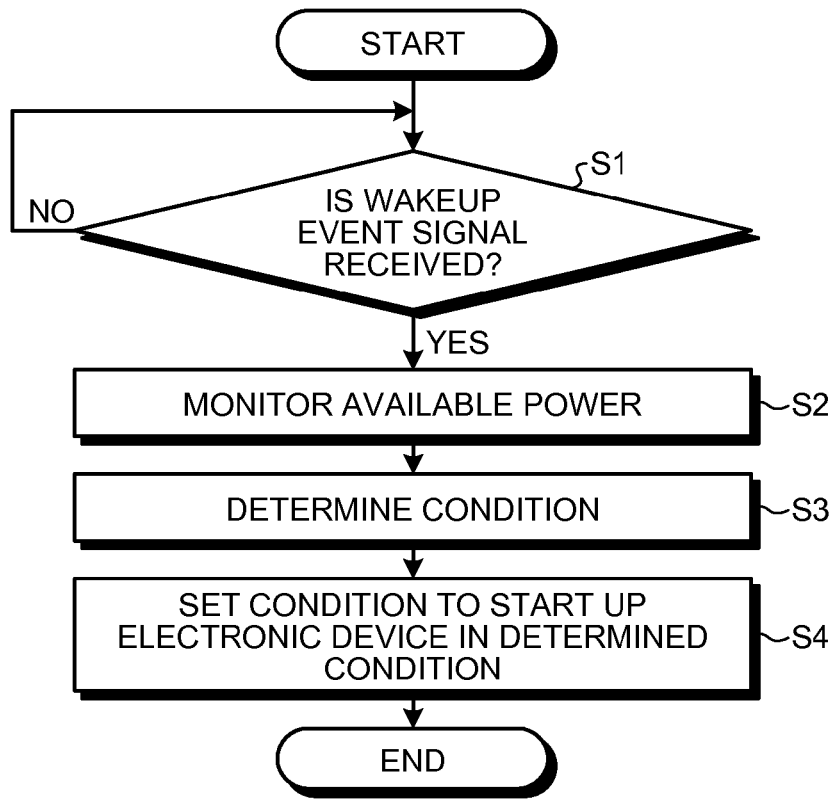
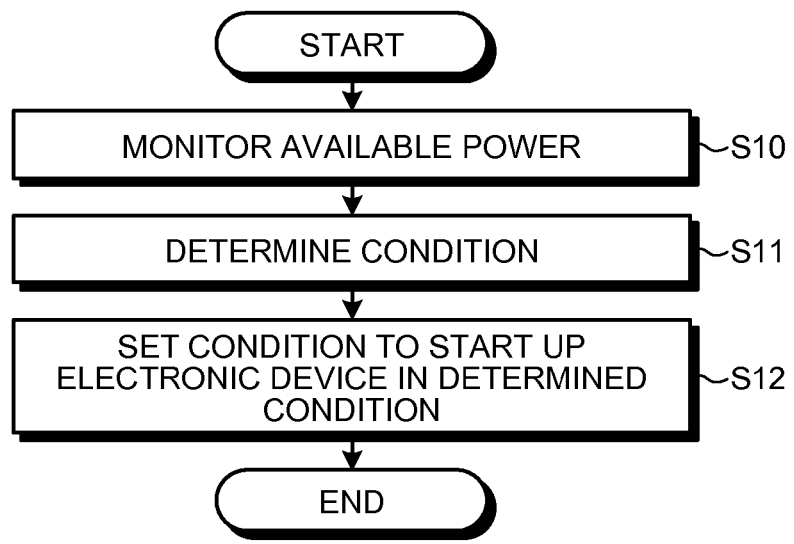

SELECTING A STARTUP CONDITION OF AN ELECTRONIC DEVICE CORRESPONDING TO AVAILABLE POWER

CROSS-REFERENCE TO RELATED APPLICATIONS

This application is based upon and claims the benefit of priority from Japanese Patent Application No. 2012-009288, filed on Jan. 19, 2012; the entire contents of which are incorporated herein by reference.

FIELD

Embodiments described herein relate generally to a control device, a control method, a computer program product, and an electronic device.

BACKGROUND

In the past, various techniques have been proposed to reduce the power consumption of an electronic device. For example, there is a technique in which data in a main memory or a processor is saved in a nonvolatile storage device when there is no input from the outside within a predetermined period of time, and power supply to the main memory or the processor is stopped so as to let an electronic device go into a sleep mode (low power mode). In the technique, when an input (for example, a wakeup event signal of exiting the sleep condition such as a touch operation of a panel or a mouse) is received from the outside in the sleep mode, the data saved in the nonvolatile storage device is returned into the main memory or the processor, and the electronic device is returned to a state before the electronic device goes into the sleep conditions as to restart a process.

In the traditional technique, when exiting the sleep mode, the electronic device goes into the same state as the state before the electronic device goes into the sleep mode, and thus an equivalent of power before the electronic device goes into the sleep mode is necessary. However, depending on states of a power source, the equivalent of the power before the electronic device goes into the sleep mode may not be obtained.

BRIEF DESCRIPTION OF THE DRAWINGS

FIG. 4 is a flowchart illustrating an example of a change process according to the embodiment; and FIG. 5 is a flowchart illustrating an example of a condition control according to the embodiment.

DETAILED DESCRIPTION

According to an embodiment, a power control device includes a storage unit, a monitor, a determining unit, and a controller. The storage device stores therein a look-up table, which includes relationship between needed power consumptions and start-up conditions of an electronic device including a plurality of modules. The start-up condition of the electronic device is determined from the needed power consumption in the look-up table and specifies a power on/off status of the modules included in the electronic device. The monitor monitors a voltage or available power supplied by a power source when the electronic device is activated. The determining unit determines a start-up condition corresponding to the needed power consumption, which corresponds to the voltage or available power monitored by the monitor, with reference to the look-up table. The controller sets a start-up condition of the electronic device to start up the electronic device in the start-up condition determined by the determining unit.

Hereinafter, various embodiments will be described in detail with reference to the accompanying drawings.

Figure 1:
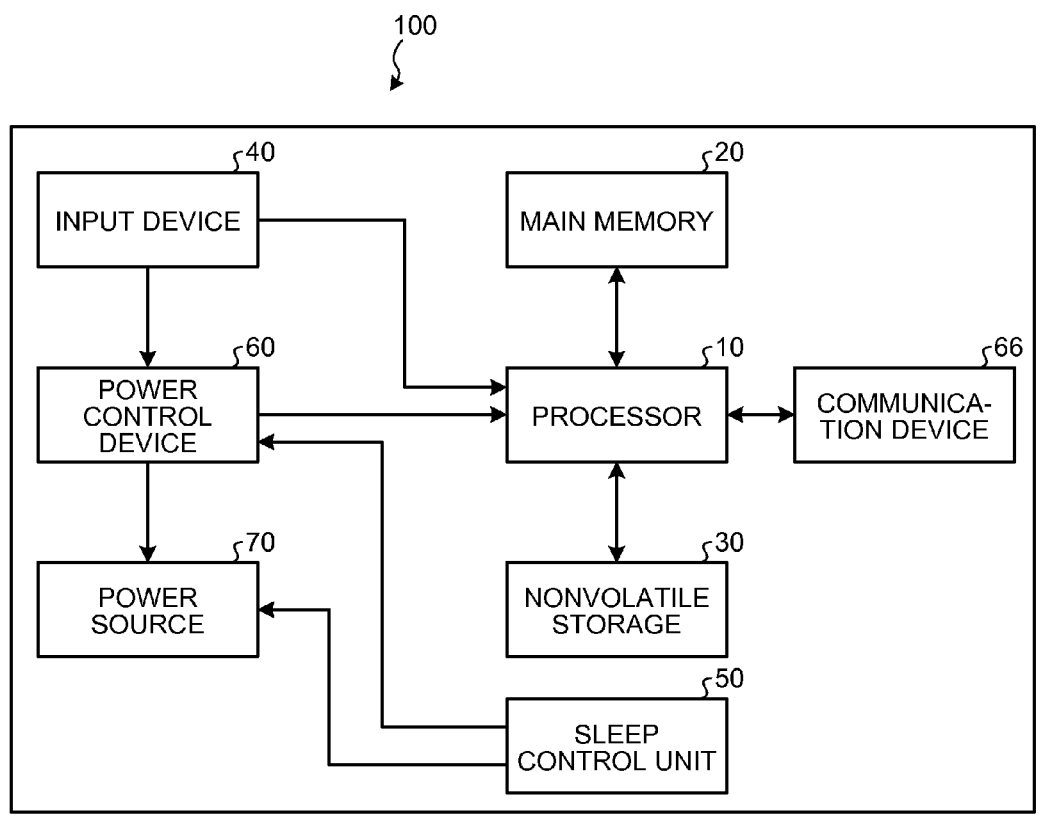
FIG. 1 is a block diagram illustrating a configuration example of an electronic device according to an embodiment.

FIG. 1 is a block diagram illustrating an example of an electronic device 100 which is a personal computer (PC) for example. As illustrated in FIG. 1, the electronic device 100 includes a processor 10, a main memory 20, a nonvolatile storage 30, an input device 40, a power control device 60, a communication device 66, a sleep control unit 50, and a power source 70. Herein, it may be considered that the electronic device 100 includes a plurality of modules which are individually controlled by power control device 60. The module includes a module within the component and a component that may individually control power. For example, a module in a system on chip (SoC) including the processor 10, the main memory 20, and the nonvolatile storage 30 may be the module.

The processor 10 reads data (for example, an OS or application software of the electronic device 100) from the main memory 20 and executes the programs, thereby controlling the entire operation of the electronic device 100. The processor 10 includes a central processing unit (CPU) and registers (not illustrated). In addition, a cache memory (not illustrated), which stores a command or data that is frequent to be accessed by the processor 10, is provided between the processor 10 and the main memory 20. In the embodiment, the cache memory includes a first cache storing frequently used data and a secondary cache memory storing an overflow of data from the first cache memory. That is, the cache memory of the embodiment consists of two levels. The first cache memory is placed closer to the processor 10 in relation to the secondary cache memory.

The nonvolatile storage 30 consists of nonvolatile memories. The nonvolatile storage 30 can hold internal data even when power supply to the nonvolatile storage 30 is stopped.

The input device 40 is a device used for various inputs, and may be configured as, for example, a mouse or a keyboard.

The sleep control unit 50 changes a state of the electronic device 100 to a sleep mode when a predetermined condition is satisfied. Herein, the predetermined condition indicates that an input through the input device 40 is not performed for a predetermined period of time. However, the predetermined condition is not limited thereto, and may be arbitrarily set.

In the embodiment, when an input through the input device 40 is not performed for a predetermined period of time, the sleep control unit 50 saves data stored in the main memory 20 or the register inside the processor 10 into the nonvolatile storage 30, and then controls the power source 70 such that power supply to the main memory 20 or the processor 10 is stopped. In this way, a state of the electronic device 100, which has a predetermined limited number of modules to be supplied with power, goes into the sleep mode. It may be considered that the sleep mode is a state in which the electronic device 100 is temporarily stopped. Here, in the embodiment, power supply to the power control device 60 continues even in the sleep mode. When a process of changing a state to the sleep mode is completed, the sleep control unit 50 informs the power control device 60 that changing of a state to the sleep mode is completed. In this way, the power control device 60 monitors that a state of the electronic device 100 has gone into to the sleep mode.

The power control device 60 controls the electronic device 100 such that an operation is performed according to a state of the power source 70. Detailed description of the power control device 60 will be made below. The function of communication device 66 is an exchange of data with an external device.

The power source 70 supplies power to each module included in the electronic device 100. For example, the power source 70 includes a power generation module such as a solar cell, and a battery that saves power generated by the power generation module.

Figures 2, 3:
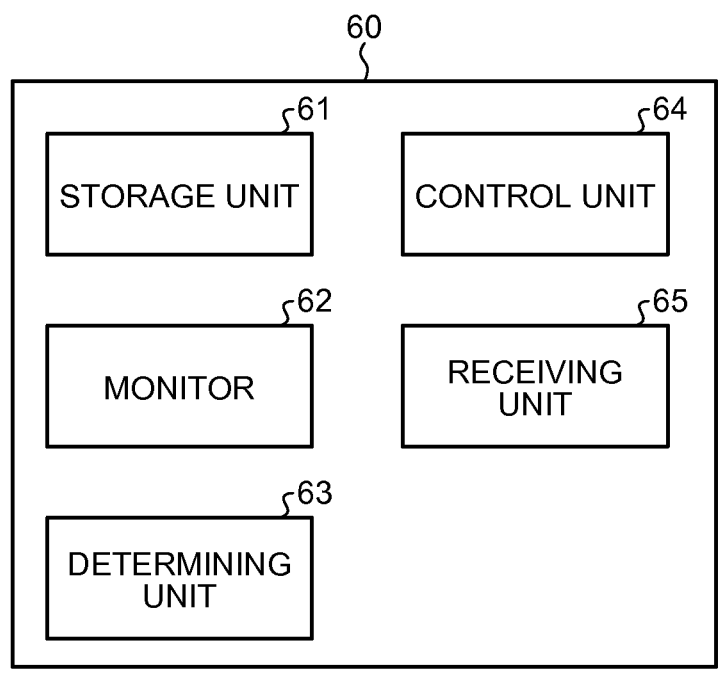
FIG. 2 is a block diagram illustrating an example of a functional configuration of a power control device according to the embodiment.
FIG. 3 is a diagram illustrating an example of a power consumption table according to the embodiment.

FIG. 2 is a block diagram illustrating an example of a functional configuration of the power control device 60. As illustrated in FIG. 2, the power control device 60 includes a storage unit 61, a monitor 62, a determining unit 63, a control unit 64, and a receiving unit 65.

The storage unit 61 stores therein a power consumption table (a look-up table) that includes relationship between needed power consumptions and start-up conditions of the electronic device 100. The start-up condition of the electronic device 100 indicates a condition in which the electronic device 100 starts up, and may include a condition in which an operation is stopped (for example, the sleep mode). FIG. 3 is a diagram illustrating an example of the power consumption table. In FIG. 3, a "first condition" given as an example of a start-up condition indicates a condition in which power is supplied to all modules included in the electronic device 100 and an operating clock of the processor 10 is set to a normal value. A "second condition" indicates a condition in which power supply to a cache is stopped and an operating clock of the processor 10 is set to a smaller value than a normal value (a clock is set to a low speed). In the example of FIG. 3, needed power consumption "X" corresponding to the first condition is set to a greater value than needed power consumption "Y" corresponding to the second condition. Herein, needed power consumption associated with each condition has a fixed value. However, the embodiment is not limited thereto, and needed power consumption associated with each condition has a predetermined range. For example, needed power consumption corresponding to the first condition may be set to a value in a range of X1 (<X) to X2 (>X), and needed power consumption corresponding to the second condition may be set to a value in a range of Y1 (<Y) to Y2 (>Y). In conclusion, needed power consumption associated with each condition may have a fixed value, or may have a predetermined range.

Returning back to FIG. 2, description is continued. The monitor 62 monitors a voltage or available power supplied by the power source 70 when the electronic device 100 is activated. As it is described below, the monitor 62 monitors available power (or alternatively, a voltage) supplied by the power source 70 when a wakeup event signal of cancelling the sleep mode is received by the receiving unit 65. Herein, it may be considered that a time when the electronic device 100 is activated refers to a point in time at which a signal causing the electronic device 100 to be changed to an operable state is received by the receiving unit 65. The determining unit 63 determines a start-up condition corresponding to power monitored by the monitor 62 (available power supplied by the power source 70) with reference to the power consumption table stored in the storage unit 61. In the example of FIG. 3, when the power corresponding to the needed power consumption "X" is monitored by the monitor 62, the first condition is determined as a start-up condition corresponding to the monitored power. In addition, for example, when the power corresponding to the needed power consumption "Y" is monitored by the monitor 62, the second condition is determined as a start-up condition corresponding to the monitored power. In addition, for example, in the power consumption table, when power corresponding to the first condition is set to a value in the range of X1 (<X) to X2 (>X), and the power corresponding to the power "X" is monitored by the monitor 62, a start-up condition corresponding to the monitored power is determined to be the first condition. Similarly, in the power consumption table, when power corresponding to the second condition is set to a value in the range of Y1 (<Y) to Y2 (>Y), and the power corresponding to the power "Y" is monitored by the monitor 62, a start-up condition corresponding to the monitored power is determined to be the second condition. In conclusion, using the power consumption table stored in the storage unit 61 and power monitored by the monitor 62, the determining unit 63 determines a start-up condition feasible with the monitored power.

The control unit 64 sets a start-up condition to start up the electronic device 100 in the star-up condition determined by the determining unit 63. For example, when the start-up condition determined by the determining unit 63 is the first condition, the control unit 64 controls the power source 70 such that power is supplied to the entire modules included in the electronic device 100, and sets an operating clock of the processor 10 to a normal value. In addition, when the start-up condition determined by the determining unit 63 is the second condition, the control unit 64 controls the power source 70 such that power supply to the cache is stopped, and power is supplied to each module other than the cache, and sets an operating clock of the processor 10 to a smaller value than the normal value.

Specifically, the power control device 60 (the control unit 64) commands the power source 70 to supply a voltage value to the processor 10 and the main memory 20 depending on a type of condition (start-up condition stored in the power consumption table) determined by the determining unit 63, and commands the power source 70 to supply a voltage value to the communication device 66 so that the communication device 66 operates. Further, the power control device 60 reports an operating clock when activating the processor 10, and an operating clock of a clock supplied to the main memory 20. Herein, depending on conditions, power that is necessary to use the communication device 66 is not enough. In this case, the power control device 60 requests the power source 70 not to supply power to the communication device 66.

The receiving unit 65 receives a wakeup event signal of cancelling the sleep mode. In the embodiment, when a user operates the input device 40 (including a touch operation), the input device 40 sends a signal corresponding to the operation to the power control device 60. In the embodiment, the signal from the input device 40 is the wakeup event signal. However, the embodiment is not limited thereto, and the wakeup event signal may be arbitrarily set.

When a signal is received from the input device 40 in the sleep mode, the power control device 60 changes a condition of the electronic device 100 from the sleep mode to a start up condition corresponding to available power supplied by the power source 70 at the point in time (this process is referred to as "change process"). FIG. 4 is a flowchart illustrating an example of the change process performed by the power control device 60. Hereinafter, the change process will be described in detail with reference to FIG. 4.

As illustrated in FIG. 4, when a wakeup event signal (for example, an input signal from the input device 40) is received by the receiving unit 65 (Yes in step S1), the monitor 62 monitors available power (or alternatively, a voltage) supplied by the power source 70 at this point in time (step S2). That is, the monitor 62 monitors available power supplied by the power source 70 at a point in time when the wakeup event signal is received. Subsequently, the determining unit 63 determines a start-up condition corresponding to the power monitored in step S2 by using the power monitored in step S2 and a power consumption table stored in the storage unit 61 (step S3). In other words, the determining unit 63 determines a start-up condition feasible with available power supplied by the power source 70 at a point in time when the wakeup event signal is received. Subsequently, the control unit 64 sets a start-up condition of the electronic device 100 to start up the electronic device 100 in the start-up condition which is determined in step S3 (step S4).

Specifically, according to the determined condition, the power control device 60 (control unit 64) informs the power source 70 of a voltage supplied to the processor 10 and the main memory 20, and commands an operating clock when the processor 10 is activated, and a frequency of a clock supplied to the main memory 20. For example, in the start-up condition determined in step S3, when power enough to perform communication using the communication device 66 is present, the power source 70 is commanded to supply power to the communication device 66 so as to operate the communication device 66. On the other hand, when power that is necessary to communicate using the communication device 66 is not enough, the power source 70 is commanded not to supply power to the communication device 66. That is, in this case, when returning from the sleep mode, the electronic device 100 is activated without communicating with an external device.

As described in the foregoing, when a wakeup event signal is received in the sleep mode, the power control device 60 according to the embodiment controls the electronic device 100 to operate in a start-up condition feasible with available power supplied by the power source 70 at a point in time when the wakeup event signal is received. Accordingly, it is possible to operate the electronic device 100 within a range of available energy (power). That is, according to the embodiment, after exiting the sleep mode, the electronic device 100 may be set to an appropriate operating state (condition).

As an modification, when the electronic device 100 is operating (or in an operable state), the power control device 60 may monitor available power supplied by the power source 70 at predetermined intervals, and set the start-up condition of the electronic device 100 to start up the electronic device 100 in the start-up condition feasible with the monitored power. In this case, the control by the power control device 60 is referred to as a condition control, and FIG. 5 is a flowchart illustrating an example of the condition control.

As illustrated in FIG. 5, first, the monitor 62 monitors available power (or alternatively, a voltage) supplied by the power source 70 at this point in time (step S10). Subsequently, the determining unit 63 determines a start-up condition corresponding to the monitored power by using the power monitored in step S10 and a power consumption table stored in the storage unit 61 (step S11). In other words, the determining unit 63 determines a start-up condition feasible with available power supplied by the power source 70 at this point in time. Subsequently, the control unit 64 sets a start-up condition of the electronic device 100 to start up the electronic device 100 in the start-up condition which is determined in step S11 (step S12).

Specifically, according to the determined condition, the power control device 60 (control unit 64) informs the power source 70 of a voltage supplied to the processor 10 and the main memory 20, and commands an operating clock when the processor 10 is activated, and a frequency of a clock supplied to the main memory 20. For example, in the start-up condition determined in step S11, when power enough to perform communication using the communication device 66 is present, the power source 70 is commanded to supply power to the communication device 66 so as to operate the communication device 66. On the other hand, when power that is necessary to communicate using the communication device 66 is not enough, the power source 70 is commanded not to supply power to the communication device 66. The power control device 60 repeatedly performs the above-described condition control at predetermined intervals.

In addition, for example, the processor 10 may perform a checking process of checking a current condition of the electronic device 100 at predetermined intervals. In this way, the processor 10 may not inquire the power control device 60 about the current condition of the electronic device 100. In addition, for example, the power control device 60 informs the processor 10 of a changed condition each time the electronic device 100 is changed to a determined condition. In this case, the processor 10 may perform the above-described checking process.

The above-described power control device 60 has a central processing unit (CPU), a ROM, a RAM, and a communication I/F device. A function of each of the above-described units (the monitor 62, the determining unit 63, the control unit 64, and the receiving unit 65) is implemented by a program, which is stored in a ROM. In addition, the invention is not limited thereto, and at least some of the functions of the respective units (the monitor 62, the determining unit 63, the control unit 64, and the receiving unit 65) may be implemented by a separate circuit (hardware).

Further, in the above-described embodiment, the power control device 60 and the processor 10 are constructed on separate chips. However, the invention is not limited thereto. For example, the above-described embodiment is implemented by using a system on chip (SoC) which includes the power control device 60 and the processor 10.

In addition, a program executed by the above-described power control device 60 may be stored in a computer connected to a network such as the Internet, and be provided by downloading the program via the network. In addition, a program executed by the above-described power control device 60 may be provided or distributed via a network such as the Internet. In addition, a program executed by the power control device 60 according to the embodiments and modifications may be incorporated into a ROM in advance, and be provided.

The above-described embodiment may be applied, for example, when an available power of a battery is decreasing due to a self-discharge, or when an equivalent of power before the state change to the sleep mode may not be generated since a solar cell is being used. In particular, since a power generation of the solar cell varies in response to an external environment, it may be more likely to fail to obtain an equivalent of an available power before the state goes into the sleep mode. The above-described embodiment is effective in such a case.

In addition, for example, in a case where an available power (available power supplied by the power source 70) which is present at a point in time when an electronic device is to be returned from the sleep mode is less than power before the electronic device goes into the sleep mode, and the available power is exhausted when a returning process of returning the electronic device 100 from the sleep mode is ended or when the returning process is being performed, the electronic device 100 may be in an inoperative state. The above-described embodiment is also effective in such a case.

Further, a type or the number of conditions stored in the power consumption table may be arbitrarily set. For example, the sleep mode and the power may be associated with each other in the power consumption table. In this configuration, when the power monitored by the monitor 62 indicates a sufficiently small value in step S2 of FIG. 4, and the sleep mode is determined in step S3 of FIG. 4 as a condition associated with the power monitored in step S2, the electronic device 100 returns to the sleep mode again (step S4 of FIG. 4).

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A power control device, comprising:
a storage that stores therein a look-up table, which includes relationship between needed power consumptions and start-up conditions of an electronic device including a plurality of modules, the start-up condition of the electronic device being determined from the needed power consumption in the look-up table and specifying a power on/off status of the modules included the electronic device,
a monitor that monitors a voltage or available power supplied by a power source when the electronic device is activated;
a determining unit configured to determine a start-up condition corresponding to needed power consumption, which corresponds to the voltage or the available power monitored by the monitor, with reference to the look-up table;
a controller that sets a start-up condition of the electronic device to start up the electronic device in the start-up condition determined by the determining unit; and
a receiving unit configured to receive a wakeup event signal of exiting a sleep mode in which the number of the modules supplied with power is limited to a predetermined number and an operation of the electronic device is stopped,
when the receiving unit receives the wakeup event signal, the monitor monitors the voltage or the available power supplied by the power source, the determining unit determines a condition corresponding to the power monitored by the monitor, and the controller sets a start-up condition of the electronic device to start up the electronic device in the condition determined by the determining unit.

2. The device according to claim 1, wherein the power source includes a solar cell.

3. The device according to claim 1, wherein the electronic device goes into the sleep mode when a predetermined condition is satisfied.

4. The device according to claim 1, wherein the monitor monitors a voltage or available power supplied by the power source when a signal causing the electronic device to be activated is received.

5. A power control method, comprising:
monitoring voltage or available power supplied by a power source when an electronic device is activated, the electronic device including a plurality of modules;
determining a start-up condition corresponding to the voltage or the available power monitored through the monitoring with reference to a look-up table, which includes relationship between needed power consumptions and start-up conditions of the electronic device, each of the conditions indicating an operation state of the electronic device, the start-up condition of the electronic device being determined from the needed power consumption in the look-up table and specifying a power on/off status of the modules included in the electronic device;
setting the start-up condition of the electronic device to start up the electronic device in the condition determined through the determining; and
receiving a wakeup event signal of exiting a sleep mode in which the number of the modules supplied with power is limited to a predetermined number and an operation of the electronic device is stopped,
when receiving the wakeup event signal, monitoring the voltage or the available power supplied by the power source, determining a condition corresponding to the power monitored by the monitor, and setting a start-up condition of the electronic device to start UP the electronic device in the condition determined.

6. The method according to claim 5, wherein the monitoring includes monitoring a voltage or available power supplied by the power source when a signal causing the electronic device to be activated is received.

7. A computer program product embodied therewith a non-transitory computer-readable medium containing a program that causes a computer to execute:
monitoring voltage or available power supplied by a power source when an electronic device is activated, the electronic device including a plurality of modules;
determining a start-up condition corresponding to needed power consumption, which corresponds to the voltage or the available power monitored through the monitoring, with reference to a look-up table, which includes relationship between needed power consumptions and start-up conditions of the electronic device, the start-up condition of the electronic device being determined from the needed power consumption in the look-up table and specifying a power on/off status of the modules included in the electronic device;
setting the start-up condition of the electronic device to start up the electronic device in the condition determined through the determining; and
receiving a wakeup event signal of exiting a sleep mode in which the number of the modules supplied with power is limited to a predetermined number and an operation of the electronic device is stopped,
when receiving the wakeup event signal, monitoring the voltage or the available power supplied by the power source, determining a condition corresponding to the power monitored by the monitor, and setting a start-up condition of the electronic device to start UP the electronic device in the condition determined.

8. The computer program product according to claim 7, wherein the monitoring includes monitoring a voltage or available power supplied by the power source when a signal causing the electronic device to be activated is received.

9. An electronic device including a plurality of modules, the electronic device comprising:

a storage unit that stores therein a look-up table, which includes relationship between needed power consumptions and start-up conditions of an electronic device, the start-up condition of the electronic device being determined from the needed power consumption in the lookup-up table and specifying a power on/off status of the plurality of modules included the electronic device, a monitor that monitors a voltage or available power supplied by a power source when the electronic device is activated;

a determining unit configured to determine a start-up condition corresponding to needed power consumption, which corresponds to the voltage or available power monitored by the monitor, with reference to the look-up table;

a controller that sets a start-up condition of the electronic device to start up the electronic device in the start-up condition determined by the determining unit; and a receiving unit configured to receive a wakeup event signal of exiting a sleep mode in which the number of the modules supplied with power is limited to a predetermined number and an operation of the electronic device is stopped, when the receiving unit receives the wakeup event signal, the monitor monitors the voltage or the available power supplied by the power source, the determining unit determines a condition corresponding to the power monitored by the monitor, and the controller sets a start-up condition of the electronic device to start up the electronic device in the condition determined by the determining unit.

10. The electronic device according to claim 9, wherein the monitor monitors a voltage or available power supplied by the power source when a signal causing the electronic device to be activated is received.

* * * * *